March 15, 1927.

P. C. DIMBERG 1,621,001

METHOD OF MANUFACTURING TURBINES

Filed March 29, 1924   2 Sheets-Sheet 1

Inventor
P. C. Dimberg
by
Attorney

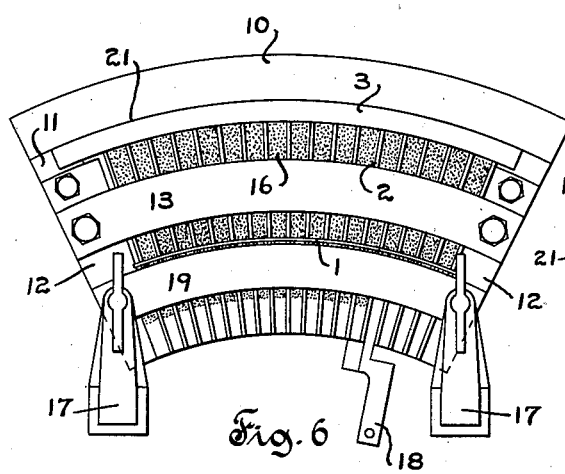
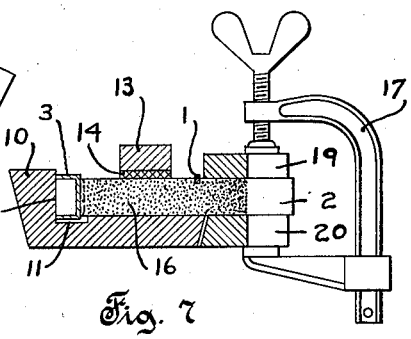
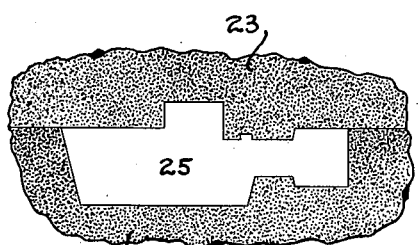
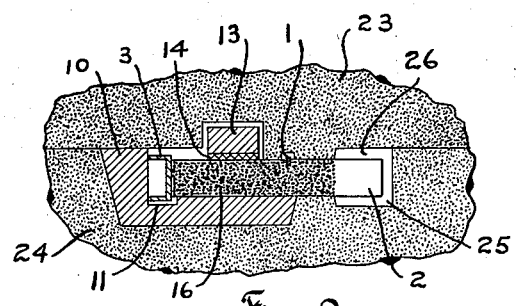
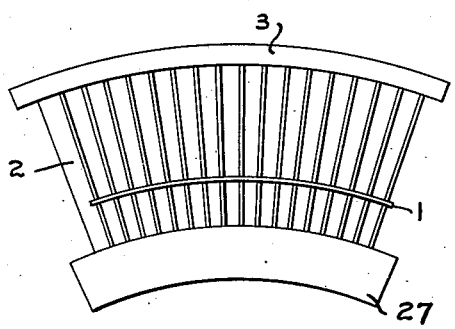
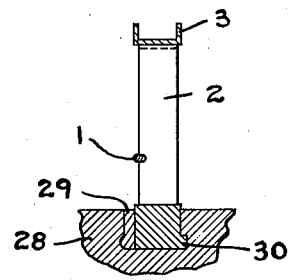

Patented Mar. 15, 1927.

1,621,001

UNITED STATES PATENT OFFICE.

PAUL C. DIMBERG, OF WAUWATOSA, WISCONSIN, ASSIGNOR TO ALLIS-CHALMERS MANUFACTURING COMPANY, OF MILWAUKEE, WISCONSIN, A CORPORATION OF DELAWARE.

METHOD OF MANUFACTURING TURBINES.

Application filed March 29, 1924. Serial No. 702,782.

This invention relates in general to improvements in the art of assembling and uniting elements in predetermined relation to each other, and relates more specifically to an improved method of and apparatus for rigidly joining a plurality of properly spaced and angled turbine blades to form an integral segment.

An object of the invention is to provide an improved method of assembling and uniting turbine blades or the like, whereby a more efficient final structure is produced. Another object of the invention is to provide improvements in the process of manufacturing turbine blade or other segments comprising a plurality of similar elements, whereby the cost of production is reduced to a minimum. A further object of the invention is to provide simple and efficient apparatus for effecting commercial exploitation of the improved processes.

Prior to the present improvement, it was customary to employ the following method of assembling and uniting a plurality of turbine blades, into a unitary segment. The blades were first assembled and clamped in a jig provided with blade spacing and angling means, after which the spaces between the blades were packed with sand which was removed and rammed back at the blade roots to provide for attachment of a foundation segment. A mold was then provided having a space substantially similar in contour to that of the body of the angling and spacing jig with the assembled blades thereon, but having an additional space provided for the formation of a foundation segment by casting. The jig with the assembled sand packed blades clamped thereon, was then placed in the mold and the foundation segment was cast upon the blade ends, after which a shroud strip was permanently attached to the opposite ends of the blades. In order to permit free shrinkage of the segment after the casting operation, it was necessary with the method of the prior art, to remove the jig and the blades from the mold while the foundation casting was still relatively hot, and to release the clamps which held the blades against the spacing and angling portion of the jig. This prior method of forming blade segments was objectionable because it was slow and cumbersome due to the fact that it was necessary to wait until one segment had been formed and had cooled, before the spacing and angling jig could again be used, and it required a large number of these jigs to insure sufficiently extensive production. The prior method was also objectionable because of the necessity of opening the mold while the foundation casting was still hot and because relatively unskilled foundry labor was depended upon to properly assemble the blades in the jig.

The present invention contemplates an improved method of assembling and uniting turbine blades or the like into segments, whereby the blades are first positively united at one end in properly spaced and angled relation, and the foundation segment is subsequently rigidly attached by fusion of metal to the opposite blade ends while the blades are entirely free to move to accommodate expansion and contraction thus avoiding necessity of opening the mold at any predetermined instant. With the improved method, the blade segment may be temporarily assembled in the machine shop by individuals who are relatively expert in that particular occupation, thus insuring efficient assemblage of the blading. The improved method also considerably reduces the equipment necessary for extensive production, by permitting reuse of each angling and spacing jig immediately after one segment has been temporarily assembled and before the foundation casting has been completed. These and other objects and advantages of the improved method will be apparent in the course of the following description.

A clear conception of the various steps of the improved method and of the construction and operation of the apparatus for commercially exploiting the same, may be had by referring to the drawings accompanying and forming a part of this specification in which like reference characters designate the same or similar parts in the various views.

Fig. 6 is a plan view of the core box having a segment of sand packed blades therein showing the method of removing the sand from the spaces between the root ends of the blades.

Fig. 7 is a section through the apparatus of Fig. 6, showing a blade segment therein with the blade roots prepared for casting of the foundation segment.

Fig. 8 is a section through a mold preparatory to receiving the assembled blades and holding jig prior to casting of the foundation segment.

Fig. 9 is a section through the mold of Fig. 8, with a segment of blades disposed therein preparatory to casting of the foundation segment.

Fig. 10 is an elevation of a completed blade segment after removal thereof from the mold.

Fig. 11 is a section through a blade segment which has been completely finished, showing the same applied to adjacent supporting structure of a turbine.

Figure 1:
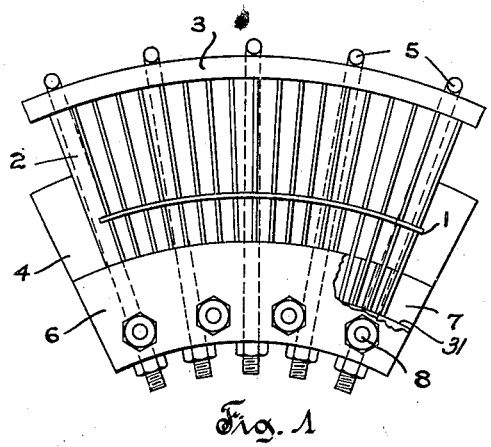
Fig. 1 is a plan view of a blade spacing and angling jig showing a plurality of blades assembled and clamped therein.
Figure 2:
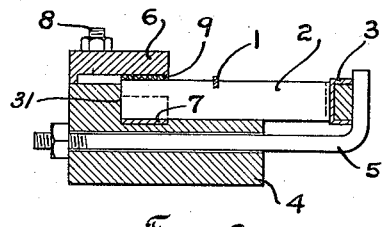
Fig. 2 is a section through the spacing and angling jig of Fig. 1, showing blades assembled and clamped therein.

In carrying out the improved process of manufacturing turbine blade segments, a blade spacing and angling jig such as shown in Figs. 1 and 2, is first provided. This jig consists of a supporting plate or other support 4 having a substantially plane upper supporting surface and having an end surface 31 of proper curvature extending perpendicular to an end of the supporting surface; a retaining plate 6 of segmental form adapted to be secured to the support 4 by means of studs 8 and nuts associated therewith; a segmental notched spacing and angling strip 7 secured to the support 4 beneath the overhanging edge of the plate 6; a resilient or flexible strip 9 attached to the lower face of the overhanging portion of the plate 6; and a series of radially disposed clamps 5 loosely disposed in horizontal through openings in the support 4 and having their outer ends bent at substantially a right angle and their opposite ends screw threaded to receive clamp adjusting nuts. The blades 2 which are adapted to be assembled in such a jig, are ordinarily of uniform cross sectional area throughout their lengths and are cut to equal sizes.

When assembling such blades in the spacing and angling jig, the top plate 6 is first released sufficiently to permit the blades 2 to be slipped endwise into the spacing and angling notches of the segmental strip 7. After the blades have been thus properly inserted within the jig, a channel or U-shaped shroud strip or segment 3 having notches therein of cross section substantially similar to that of the blade ends, is applied to the outer free ends of the blades 2 and is clamped in position by means of the clamps 5 as indicated in Figs. 1 and 2. With the clamps 5 properly adjusted, the foundation ends of the blades 2 are held in contact with the surface 31 of the support 4. The plate 6 is then clamped into position with the aid of the studs 8 and the nuts coacting therewith, causing rigid clamping of the foundation ends of the blades 2 between the flexible strip 9 and the notched retaining segment 7. While the blades 2 are thus positively held in properly spaced and angled position, the shroud strip 3 is rigidly attached thereto by brazing, soldering or otherwise. If the blades 2 are of considerable length, it is desirable to provide a bracing or lacing strip 1 intermediate the ends of the blades, provision for the reception of such a lacing strip being made by notching the blades 2 before assemblage thereof. With the blades assembled in the spacing and angling jig, the lacing strip 1 may also be brazed or otherwise attached to the blades 2 as shown in the drawing. When the shroud strip 3 and the lacing strip 1 have been thus applied, the blades 2 are rigidly united to produce a unitary segment, and may be removed from the spacing and angling jig upon release of the top plate 6 and of the clamps 5. The work of temporarily assembling the blades into the segments may be accomplished in the machine shop by experts in the art of assembling and brazing or soldering or otherwise uniting blade segments.

Figure 3:
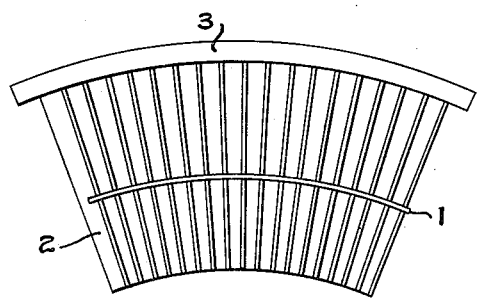
Fig. 3 is a plan view of a blade segment temporarily but rigidly assembled by attachment thereto of a shroud and lacing strip.
Figure 4:
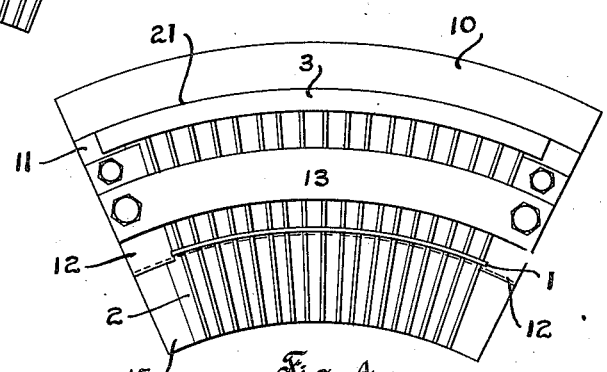
Fig. 4 is a plan view of a core box of the type employed while packing sand into the spaces between the blades.
Figure 5:
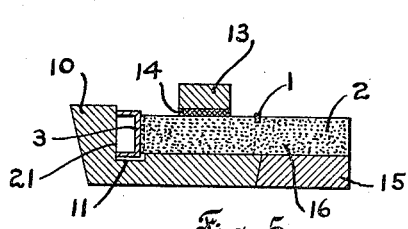
Fig. 5 is a section through the apparatus of Fig. 4 showing a blade segment therein with the spaces between the blades completely packed with sand.

The temporarily rigidly united blade segment consisting of the radiating blades 2 having a shroud strip 3 and lacing strip 1 attached thereto as shown in Fig. 3, may then be transferred to the foundry, being ready to receive the cast metal foundation segment. In the foundry a core box such as shown in Figs. 4 to 9 inclusive is provided, the core box consisting of a supporting plate 10 having a segmental groove 11 therein and a perpendicular properly curved surface 21 adjacent to the groove 11; a pair of end blocks 12 associable with the support 10 as shown in Figs. 4 and 6; and a segmental retaining plate 13 adapted for attachment to the support 10 through the end blocks 12, the plate 13 having a flexible bearing strip 14 coactible directly with the blade edges. The core box 10 has a curved end surface cooperable with a segmental plate 15 to form a horizontal surface beneath the entire blade segments. The temporary blade segment may be readily applied to the core box upon removal and replacement of the retaining plate 13, as shown in Figs. 4 and 5 after which the spaces between the successive blades 2 may be completely filled with sand 16 as indicated in Fig. 5.

The plate 15 may then be removed and a narrower bottom plate 20 such as shown in Figs. 6 and 7, substituted for the plate 15. A segmental top plate 19 such as shown in Figs. 6 and 7 is then placed against the edges of the blades 2 above the bottom plate 20, the plates 19, 20 being clamped against the opposite edges of the blades 2 by means of clamps 17. With the plates 19, 20 properly positioned and clamped to the blades 2, the foundation ends of the blades project beyond the plates 19, 20 and a portion of the sand 16 is removed from between the projecting blade ends. A ramming tool 18 such as shown in Fig. 6 is then utilized to obtain smooth surfaces adjacent to the plates 19, 20. After the root ends of the blades 2 have been thus properly prepared for the reception of the foundation segment, the clamps 17 are released and the plates 19, 20 are removed from the core box.

With the aid of an ordinary pattern, a mold such as shown in Figs. 8 and 9 and having a space 25 formed between a cope 23 and drag 24, is next provided. The space 25 is adapted to receive the core box with a blade segment attached thereto as shown in Fig. 9, the cope 23 and drag 24 coacting with the sand packing between the blades 2 adjacent to their foundation ends, and the mold being provided with a segmental space 26 for receiving the metal which eventually forms the foundation segment. When molten metal is poured into the space 26, the metal fuses with the ends of the blades 2 and rigidly unites them.

The blade segment with the foundation segment 27 attached thereto by casting is shown in Fig. 10, the segment being ready for final finishing preparatory to application thereof to a turbine. The finishing of these segments is accomplished by inserting a sufficient number of the segments to form a substantially complete circle, in a jig and removing the surplus metal. The segment when finished is provided with a transverse projection 30 as shown in Fig. 11, which is adapted for coaction with a recess in the supporting element 28, the assembled blade segment being held in proper position by means of a calking strip 29.

It will thus be noted that with the improved process, the blades 2 are first definitely positioned in the temporary spacing and angling jig after which they are rigidly temporarily united by attachment of the shroud 3, and in some instances the lacing strip 1. The temporarily assembled segments may be produced in the machine shop by relatively skilled mechanics. After temporary assemblage of the blades, the segments may be transferred to the foundry where the foundation segments 27 may be applied. The improved method obviously eliminates necessity of opening the mold before the foundation segment has fully cooled, as the blades 2 are free to move to accommodate expansion and contraction while within the mold. The temporary holding and clamping jig may be utilized to temporarily assemble blade segments in rapid succession, and this is also true to some extent of the core box which is used to hold the blades during the casting operation. It is therefore obvious that the speed of production is materially increased over that attainable with the prior methods.

It should be understood that it is not desired to limit the invention to the exact steps of the process and to the exact details of construction and operation of the apparatus herein shown and described, for various modifications within the scope of the claims may occur to persons skilled in the art.

It is claimed and desired to secure by Letters Patent:

1. The method of manufacturing a turbine blade segment, which comprises, definitely positioning a plurality of blades to produce proper working passages therebetween, rigidly permanently attaching a shroud segment to the corresponding ends of said blades, and permanently attaching a foundation segment to the opposite ends of said blades by fusion of metal.

2. The method of manufacturing a turbine blade segment, which comprises, definitely positioning a plurality of blades to produce proper working passages therebetween, rigidly permanently attaching a shroud segment to the corresponding ends of said blades, placing the end united blades in a mold, and casting a permanent foundation segment upon the opposite ends of said blades.

3. The method of manufacturing a turbine blade segment, which comprises, definitely positioning a plurality of blades to produce proper working passages therebetween, rigidly attaching a shroud segment to the corresponding ends of said blades by fusion of metal, and permanently attaching a foundation segment to the opposite ends of said blades by fusion of metal.

4. The method of manufacturing a turbine blade segment, which comprises, definitely positioning a plurality of blades to produce proper working passages therebetween, rigidly attaching a shroud segment to the corresponding ends of said blades by fusion of metal, placing the end united blades in a mold, and casting a permanent foundation segment upon the opposite ends of said blades.

5. The method of manufacturing a turbine blade segment, which comprises, definitely temporarily positioning a plurality of independent blades to produce proper working passages therebetween, rigidly permanently attaching a shroud segment to the corresponding ends of said blades, placing the end united blades as a unit into a mold, and casting a permanent foundation segment upon the opposite ends of said blades.

6. The method of manufacturing a turbine blade segment, which comprises, definitely temporarily positioning a plurality of independent blades to produce proper working passages therebetween, permanently attaching a shroud segment to the corresponding ends of said blades, and attaching a permanent foundation segment to the opposite ends of said blades by fusion of metal.

7. The method of manufacturing a turbine blade segment, which comprises, definitely temporarily positioning a plurality of independent blades, permanently brazing a shroud segment to the corresponding ends of said temporarily positioned blades, filling the spaces between successive blades with incombustible material while permitting the free ends of said blades to project beyond said material, placing the blades with the intervening spaces filled into a mold, and casting a foundation segment upon the projecting ends of said blades.

8. The method of manufacturing a turbine blade segment, which comprises, temporarily definitely spacing and angling a plurality of independent blades to produce proper working passages therebetween, rigidly permanently attaching a shroud segment to the corresponding ends of said blades, placing the end united blades as a unit into a mold, and attaching a permanent foundation segment to the opposite ends of said blades by fusion of metal.

9. The process of manufacturing a turbine blade segment, which comprises, temporarily definitely spacing and angling a plurality of independent blades, brazing a shroud segment to the corresponding ends of said blades, filling the spaces between the successive blades with sand while permitting the free ends of the blades to project beyond said sand, placing the sand packed blades into a mold, and casting a foundation segment around the projecting ends of said blades.

In testimony whereof, the signature of the inventor is affixed hereto.

PAUL C. DIMBERG.